(12) United States Patent
Sebree et al.

(10) Patent No.: US 10,521,397 B2
(45) Date of Patent: Dec. 31, 2019

(54) SYSTEM AND METHODS OF PROACTIVELY SEARCHING AND CONTINUOUSLY MONITORING CONTENT FROM A PLURALITY OF DATA SOURCES

(71) Applicant: HYLAND SWITZERLAND SARL, Geneva (CH)

(72) Inventors: Benjamin Nathaniel Sebree, Shawnee, KS (US); Kevin James Albrecht, Shawnee, KS (US); Anthony Clayton Kovschak, Overland Park, KS (US); Nicholas William Scherzer, Shawnee, KS (US); Jennifer Lynn Sebree, Shawnee, KS (US)

(73) Assignee: HYLAND SWITZERLAND SARL, Geneva (CH)

( * ) Notice: Subject to any disclaimer, the term of this patent is extended or adjusted under 35 U.S.C. 154(b) by 152 days.

(21) Appl. No.: 15/392,304

(22) Filed: Dec. 28, 2016

(65) Prior Publication Data
US 2018/0181623 A1 Jun. 28, 2018

(51) Int. Cl.
*G06F 16/00* (2019.01)
*G06F 16/14* (2019.01)

(52) U.S. Cl.
CPC .................. *G06F 16/148* (2019.01)

(58) Field of Classification Search
CPC ......... G06F 17/30106; G06F 17/30522; G06F 17/30283; G06F 17/30; G06F 17/30952; G06F 17/30315; G06F 17/30613; G06F 17/30622; G06F 17/30628; G06F 17/2217; G06F 16/00; G06F 16/148; G06F 3/04842; G06F 17/30174; G06F 17/30117; G11C 16/08; G06Q 50/20; G06Q 40/08; H03M 7/46; H03K 19/17728; H04L 67/1095; H04L 67/42
See application file for complete search history.

(56) References Cited

U.S. PATENT DOCUMENTS

| | | | |
|---|---|---|---|
| 2003/0023473 A1* | 1/2003 | Guyan | G06Q 10/06311 705/4 |
| 2004/0015783 A1* | 1/2004 | Lennon | G06F 16/258 715/235 |
| 2004/0181543 A1* | 9/2004 | Wu | G06F 16/90324 707/E17.137 |
| 2005/0060647 A1* | 3/2005 | Doan | G06F 16/248 715/205 |

(Continued)

*Primary Examiner* — Anh Ly
(74) *Attorney, Agent, or Firm* — Medley, Behrens & Lewis, LLC (57) ABSTRACT

A method for monitoring content from a plurality of data sources includes performing an initial search for the content by receiving a keyword to be used in searching for the content from the data sources, searching the plurality of data source for the content associated with the keywords, preventing an action to be performed on the one or more relevant content identified to be associated with the keyword, and notifying one or more users regarding the relevant content that is be associated with the keywords. After performing the initial search for the content, the method may continuously monitor the plurality of data sources to determine if the data sources generate new content that is associated with the keywords and preventing an action to be performed on the new content determined to be associated with the keyword.

18 Claims, 2 Drawing Sheets

(56) References Cited

U.S. PATENT DOCUMENTS

| | | | |
|---|---|---|---|
| 2006/0026147 A1* | 2/2006 | Cone | G06F 17/30867 707/E17.109 |
| 2006/0036568 A1* | 2/2006 | Moore | G06F 16/168 707/E17.01 |
| 2007/0009066 A1* | 1/2007 | Fredriksson | H03L 7/0812 375/326 |
| 2007/0079383 A1* | 4/2007 | Gopalakrishnan | G06K 9/00885 726/26 |
| 2008/0222131 A1* | 9/2008 | Wang | G06F 17/30867 707/E17.109 |
| 2008/0320011 A1* | 12/2008 | Crockett | G06F 16/13 707/E17.044 |
| 2009/0282021 A1* | 11/2009 | Bennett | G06F 17/30648 707/E17.014 |
| 2010/0146536 A1* | 6/2010 | Craner | H04N 7/163 725/28 |
| 2011/0082848 A1* | 4/2011 | Goldentouch | G06F 17/30867 707/706 |
| 2011/0093471 A1* | 4/2011 | Brockway | G06F 17/30616 707/747 |
| 2011/0119262 A1* | 5/2011 | Dexter | G06F 17/30014 707/726 |
| 2011/0258375 A1* | 10/2011 | Khosrowpour | G06F 16/90 711/108 |
| 2011/0295612 A1* | 12/2011 | Donneau-Golencer | G06Q 30/02 705/1.1 |
| 2013/0067392 A1* | 3/2013 | Leonard | G06F 3/0488 715/784 |
| 2013/0166546 A1* | 6/2013 | Shen | G06F 17/30029 707/723 |
| 2014/0012767 A1* | 1/2014 | Schmidt | G06Q 50/18 705/311 |
| 2014/0040312 A1* | 2/2014 | Gorman | G06F 17/2785 707/771 |
| 2015/0186504 A1* | 7/2015 | Gorman | G06F 16/24522 707/752 |
| 2015/0301903 A1* | 10/2015 | Mutha | G06F 16/162 707/692 |
| 2015/0355935 A1* | 12/2015 | Ozaki | G06F 11/0709 718/100 |
| 2016/0225271 A1* | 8/2016 | Robichaud | G06F 17/30663 707/E17.045 |
| 2017/0041296 A1* | 2/2017 | Ford | H04L 63/0421 707/E17.032 |
| 2017/0280191 A1* | 9/2017 | Stathacopoulos | G11B 27/105 |
| 2018/0039654 A1* | 2/2018 | Rodrigues | H04L 67/1095 |

* cited by examiner

SYSTEM AND METHODS OF PROACTIVELY SEARCHING AND CONTINUOUSLY MONITORING CONTENT FROM A PLURALITY OF DATA SOURCES

CROSS REFERENCES TO RELATED APPLICATIONS

None

STATEMENT REGARDING FEDERALLY SPONSORED RESEARCH OR DEVELOPMENT

None.

REFERENCE TO SEQUENTIAL LISTING, ETC.

None.

BACKGROUND

1. Technical Field

The present invention relates generally to a system and methods of proactively searching and continuously monitoring content from a plurality of data sources. More specifically, it relates to a system and methods of proactively and continuously monitoring content from a plurality of disparate data sources based on one or more keywords and applying a hold operation on the content.

2. Description of the Related Art

Unauthorized disclosures of sensitive documents have led to increased information security and privacy measures. The need to protect classified information quickly and securely has never been more important given the huge amount of data that is generated in an organization or in an enterprise on a regular basis. Moreover, security risks continually evolve and there is a present need for improved measures to proactively identify, evaluate, and manage system risks. Monitoring the generation and transmission of documents of interest may also provide invaluable insights that can be used to obtain knowledge about various aspects of subscribers, users, or devices in an enterprise network.

Tracking important documents from a high volume of content being generated on a regular basis can easily become cumbersome. Companies may perform a regular search of relevant content (e.g., documents of interest) in order to determine if there is sensitive or important content being generated or disseminated that requires attention. However, with the high volume of content being generated, repeated searching may become time-consuming and inefficient. While scheduled searching may also be performed, sensitive content may be disclosed long before the searching has occurred and intentional disclosures and accidental leaks are discovered.

In one example high-level scenario, a litigation case or an audit against a company may require identification of content that satisfies certain keywords and/or conditions in order for individuals involved to perform a full and thorough investigation. Known solutions fail to identify content from multiple disparate storage systems or posted in the web or in social media platforms, and applying a hold that prevents unauthorized tampering, transmission, and/or disclosure of the identified content. As new content is generated by users through various platforms and devices in the organization-known solutions do not continuously look or monitor for keywords or index data from the new content and automatically apply the hold on the newly generated content that may be considered relevant or important by the organization. There is currently no technological solution that will allow organizations to monitor sensitive, confidential, and/or important content as they are generated and prevent any tampering or modification of the content.

As such, there is a need for a solution that allows users to automatically comprehensively, proactively, and continuously pull content from disparate electronic storage systems, whether internal or external to the company, and inclusive of social media networks based on a defined set of criteria. There is also a need for a solution that enables flagging, compiling, and holding the content for future review in order to prevent unauthorized sharing of potentially sensitive information.

SUMMARY

System and methods for searching and monitoring content from a plurality of data sources are disclosed. One example method of the searching and monitoring includes performing an initial search of relevant content from the plurality of data sources. Performing the initial search may include receiving a keyword to be used in searching for the one or more relevant content from the plurality of data sources, searching the plurality of data sources for the one or more relevant content associated with the keyword and receiving from the data sources results of the searching. The example method may further comprise preventing an action to be performed on the one or more relevant content identified to be associated with the keyword, and notifying one or more users regarding the one or more relevant content that is associated with the keyword. After performing the initial search, the example method may further include continuously monitoring the plurality of data sources to determine if the plurality of data sources generate new content that is associated with the keyword and preventing an action to be performed on the new content determined to be associated with the keyword.

From the foregoing disclosure and the following detailed description of various example embodiments, it will be apparent to those skilled in the art that the present disclosure provides a significant advance in the art of methods for proactively and continuously monitoring a plurality of data sources for one or more documents of interest that satisfy one or more specified keyword. Additional features and advantages of various example embodiments will be better understood in view of the detailed description provided below.

BRIEF DESCRIPTION OF THE DRAWINGS

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

DETAILED DESCRIPTION OF THE DRAWINGS

It is to be understood that the disclosure is not limited to the details of construction and the arrangement of components set forth in the following description or illustrated in the drawings. The disclosure is capable of other example embodiments and of being practiced or of being carried out in various ways. For example, other example embodiments may incorporate structural, chronological, process, and other changes. Examples merely typify possible variations. Individual components and functions are optional unless explicitly required, and the sequence of operations may vary. Portions and features of some example embodiments may be included in or substituted for those of others. The scope of the disclosure encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Further, the use of the terms "a" and "an" herein do not denote a limitation of quantity but rather denote the presence of at least one of the referenced item.

In addition, it should be understood that example embodiments of the disclosure include both hardware and electronic components or modules that, for purposes of discussion, may be illustrated and described as if the majority of the components were implemented solely in hardware.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block or combinations of blocks in the diagrams discussed in detail in the description below.

These computer program instructions may also be stored in a non-transitory computer-readable medium that may direct a computer or other programmable data processing apparatus to function in a particular manner, such that the instructions stored in the computer-readable medium may produce an article of manufacture, including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks.

Accordingly, blocks of the diagrams support combinations of means for performing the specified functions, combinations of steps for performing the specified functions and program instruction means for performing the specified functions. It will also be understood that each block of the diagrams, and combinations of blocks in the diagrams, can be implemented by special purpose hardware-based computer systems that perform the specified functions or steps, or combinations of special purpose hardware and computer instructions.

Disclosed are system and methods for proactively and automatically monitoring and searching content that satisfy a predefined set of conditions and/or keywords. In one example embodiment of the present disclosure, the method may include defining by a user a set of keywords and/or conditions and initiating a search for content that satisfy the defined set of keywords and/or conditions. In some other example embodiments, the method may include receiving the defined set of keywords and/or conditions stored in a configuration or definition file.

Content is searched from a plurality of domains or data sources using a single search request initiated by the user at a client device. The searching may allow identification of content from multiple data sources including, but not limited to, social media information and enterprise information using an internal search process on data sources within the enterprise system and an external search process on one or more public web sites or social networking sites., The searching may be performed using a single search query, which is used to search for content generated and/or stored in the data sources at an earlier time and for proactive and continuous monitoring of new content that may be generated at or by the plurality of data sources in real time. The search may return content from the plurality of data sources that meet the conditions. A hold may be placed on the identified content such that no modification, deletion, transmission, and other actions may be performed on the identified content in order to preserve the integrity of the content. A notification may be sent to one or more users informing them of the identified content that has been flagged for review.

For purposes of the present disclosure, it will be appreciated that content may refer to files such as, for example, text files, image files, audio files, video files, multi-media files, documents, and/or comments or posts from social media accounts, among others. Content may also refer to any information that provides value for an end-user or content consumer in one or more specific contexts. Content may be shared via one or more media such as, for example, computing devices in a network.

Content may be generated and maintained in association with an institution or company, and the sharing of content may be performed using network-connected enterprise-wide information systems and other similar information exchanges or networks, as will be known in the art. Content may also be generated by social media. The terms content and files may be used interchangeably for illustrative purposes throughout the present disclosure.

Figure 1:
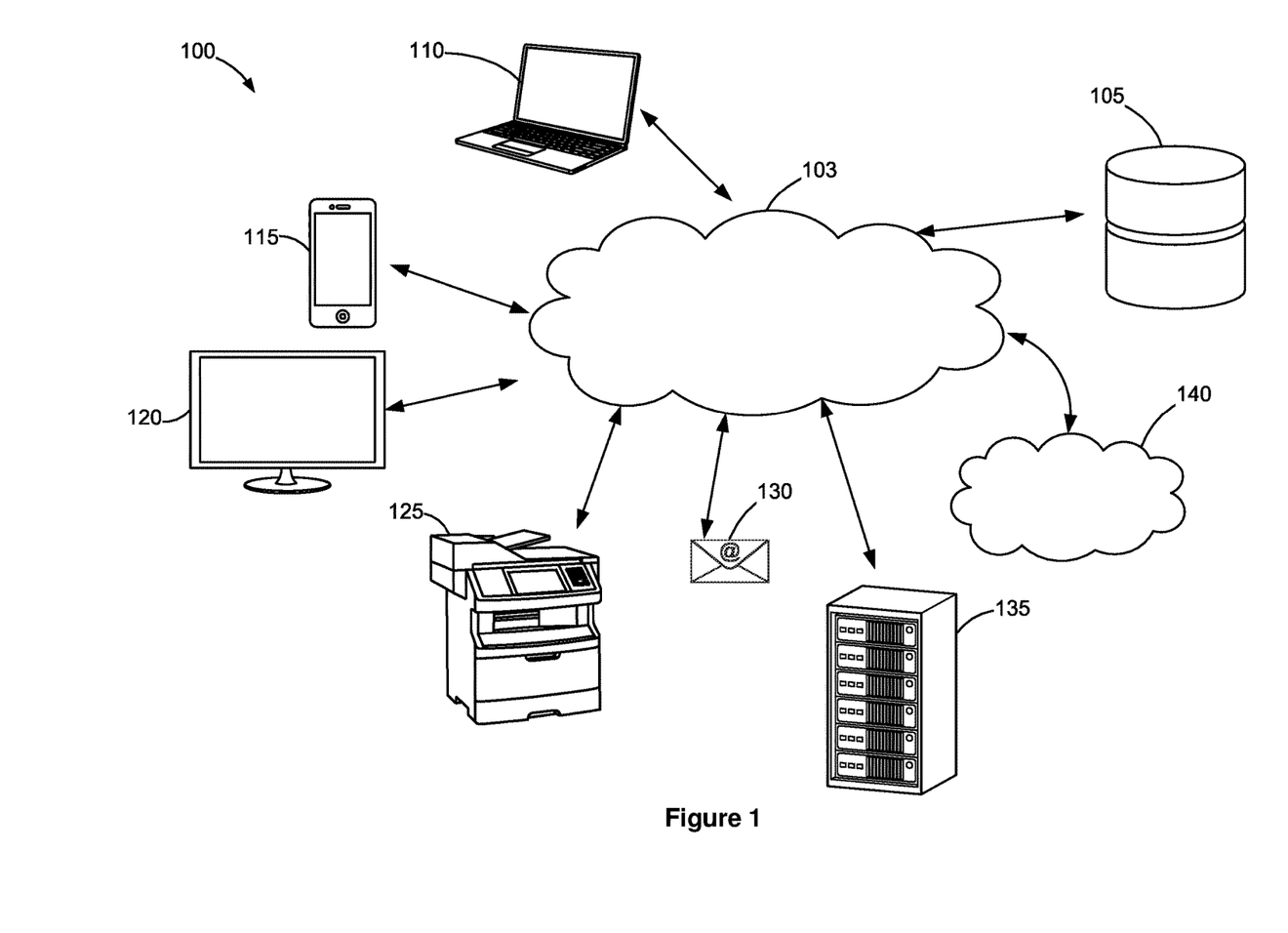
FIG. 1 shows one example system for proactively searching and continuously monitoring content from one or more disparate storage devices or data sources.

FIG. 1 shows one example system for proactively searching and continuously monitoring content from one or more disparate storage devices or data sources. Example system 100 allows an application to search for content generated from a plurality of data sources based on one or more search criteria and continuously monitor the content generated from each of the plurality of data sources to determine newly generated content that satisfies the search criteria. The content determined to satisfy the search criteria may be placed on hold such that no modification, deletion, transmission, and the like may be applied on the content prior to a review by authorized users. One or more users may be notified about the determined content.

System 100 may include one or more data sources 110-135 that are connected via a network 103. Network 103 may be any network, communications network, or network/communications network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems and/or available or known at the time of filing and/or developed after the time of the filing of this disclosure.

Data sources 110-140 in system 100 may be connected to the network through one or more interfaces that allow each of the data sources to send and receive information to and from the other. In one example embodiment and for illustrative purposes, example system 100 may be a system of an organization such as, for example, an enterprise domain, having one or more data sources 110-140 that are interconnected. Data sources 110-140 generate content that the organization may need to comprehensively, proactively, and continuously poll in order to gather information for analytics purposes or to secure the confidentiality of the content generated within the system.

Data sources 110-135 may be any device, apparatus or application that generates and stores content in their respective storage devices and/or transmits data to a server 105, over network 103. Example data sources in an organization that may be used to search and monitor relevant content may include a computing device 110, a mobile device 115, a television 120, an imaging device 125, an e-mail server 130, a client server 135, and a cloud server 140.

In one example embodiment, computing device 110 may be any computing device such as, for example, a desktop computer, a handheld computer, a personal digital assistant (PDA), a laptop or notebook computer, a netbook, a tablet computer, or any other computing device, such as a special-purpose computing device (e.g., an electronic or e-book reader). Computing device 110 may include an input device (e.g., a keyboard), a processor, and memory, such as random access memory (RAM), read-only memory (ROM), and/or non-volatile random access memory (NVRAM). Computing device 110 may also include a display unit or monitor having a user interface, such as a graphical user interface. Computing device 110 may further include a mass data storage device, such as a hard drive, CD-ROM and/or DVD units. Additionally, computing device 110 may include at least one control unit such as, for example, a processor (not shown) that controls the operation of computing device 110. Computing device 125 may be programmed with one or more software applications which may enable users to access, retrieve, and view files, information, and other resources on the Internet.

Mobile device 115 may be any mobile handheld, portable and/or pocket-sized computing device such as, for example, a smart phone, a tablet computer or other similar computing device as will be known in the art. In some example embodiments, mobile device 115 may generate content through one or more applications installed on the device and may send the generated content to a storage device such as, for example, a storage server communicatively connected with mobile device 115 and/or server 105. In other example embodiments, an application installed on mobile device 115 may be authorized to detect content generated by mobile device 115 and determine whether the generated content is relevant based on one or more specified criteria.

Television 120 may be any network-connectable television device having integrated internet features that provide online interactive media, on-demand streaming media, and/or home networking access in addition to the traditional functions of television sets, as will be known in the art. Television 120 may be a smart television integrated with internet and interactive web features. Television 120 may be able to install and execute applications receive and/or transmit data when the applications are run. In one example embodiment, television 120 may send data to server 105 or any other storage server communicatively connected to server 105. Data may include, but is not limited to, the use of television 120 and/or the applications being run and/or activated on television 120.

Imaging device 125 may be any device capable of imaging or producing an electronic or a hard copy of a data file or document, such as a laser, inkjet or dot matrix printer. In some example embodiments, imaging device 125 may be a multi-function printing device that is capable of performing additional functions, such a faxing, e-mailing, scanning and/or copying, in addition to printing. Imaging device 125 may generate data when a function is performed on or with the device. For example, imaging device 125 may generate data when a document is scanned or copied via imaging device 125. Imaging device 125 may also generate an electronic copy of a printed, faxed, scanned and/or copied document. In one example embodiment, imaging device 125 may send the electronic copy of the document to server 105 for storage and monitoring purposes. Other methods of generating content via imaging device 125 will be known in the art.

E-mail server 130 may be one or more e-mail servers for handling electronic mail on the internet. In some example embodiments, e-mail server 130 may be a device having at least one application that is used to compose, send, retrieve, and/or view e-mail messages. E-mail server 130 may also include agent machines that are used to handle the electronic mail system.

Client server 135 may be any server device for connecting to one or more client devices such as, but not limited to, computing devices over network 103. Client server 135 may store data generated from the one or more connected client devices.

Cloud server 145 may be a physical or logical server that is accessed remotely via a cloud service provider. In one example embodiment, cloud server 145 may be one or more social site servers which provide social networking services. For example, social networking services may refer to online services, platforms, and/or sites that allow individuals, groups, organizations, or other social units to form online communities and share social information or data. Social information or data includes, but is not limited to posts, texts, photos, audio content, videos, profiles, events, ideas, interests, activities, comments, hyperlinks, documents, and/or personal information. Examples of social networking sites or social site services include Facebook®, a registered trademark of Facebook, Inc.; LinkedIn®, a registered trademark of LinkedIn Corporation; Twitter®, a registered trademark of Twitter, Inc.; and Flickr®, a registered trademark of Yahoo! Inc. Each social site server may have access to a corresponding social site databases, each of which stores social content, information and/or data. Such social content, information and data may be private or public. Private social information refers to content or data that requires user authentication, such as a user name and/or password, in order to be accessible to, released to and/or viewed by a user. Private social information may also refer to content, information and/or data shared only with certain individuals or groups designated by a user. Public social information refers to content, information or data that is generally available to the public.

Server 105 may be a system such as, for example, a data storage or enterprise content management system, used by an organization or enterprise to respond to data requests and/or provide services to private users within an enterprise domain and/or to public users from external domains via the network of system 100. Server 105 may include one or more databases that store content generated from the one or more data sources 110-140 connected to server 105. In one example aspect, server 105 may include an application or service that identifies connected data sources 110-140 and gathers and actively monitors data generated from connected data sources 110-140 and/or one or more engaged applications in connected data sources 110-140 to determine if the data generated is indicative of relevant content. In one example embodiment, server 105 may include a query processing module for analyzing attributes of queries or requests sent to server 105 and a query normalization module for converting a search query into a format recognizable or otherwise suitable for presentation to a specific destination within or outside the domain of system 100. In other example embodiments, server 105 may be part of a group of geographically dispersed servers that are registered to the enterprise domain. The enterprise domain may be used to access a group of servers, among which is server 105.

In one example embodiment, server 105 may be used to search for relevant content to be provided to a device, such as computing device 110, upon a user-initiated request. Server 105 may utilize a search engine for searching relevant content stored from data sources 110-140 included in system 100. In one example embodiment, the search engine may reside on server 105 and may comprise program instructions and code for executing searches on data sources 110-140 based upon a search query. In one example aspect, the search query may be received from a user or another software program. In another example aspect, the search query may also be received from a configuration or definition file stored in or remotely from system 100.

In a second example embodiment, the search engine may reside or be part of another data source, device or computer system connected to server 105. The search engine may be configured to perform searching operations on the plurality of data sources in system 100. In one example aspect, the search engine may store an index of words and corresponding Uniform Resource Locators (URLs) which point to virtual locations of the indexed words.

Upon receiving a search query, the search engine may search through the index to look for characters and/or words that match the search query. The URLs of the characters or words identified as matching the search query and/or other related information may be provided by server 105 as relevant content to a computing device 110 for display to the user. It will be appreciated that the search engine may employ any suitable search algorithms and techniques known in the art and as will be discussed in greater detail below.

Relevant content may refer to any content, such as documents or files, of interest which satisfy one or more conditions set by a user or administrator, such that the content may be considered by the user and/or the organization as warranting review and/or attention. For example, in some example embodiments, relevant content may be documents that are considered confidential, sensitive, and/or proprietary in nature and may need authorization before being accessed by some users in the organization or prior to being disclosed to the public. In other example embodiments, relevant content may be content whose occurrence may be monitored by server 105 for analytics purposes. Relevant content may include data used by an enterprise or organization such as, for example, profiles, contact information, e-mails, documents, images, news feeds, products, services, and/or events associated with the enterprise.

Server 105 may implement a solution that automatically detects relevant content generated from the plurality of disparate data sources that are communicatively connected to server 105, thereby reducing risks and liabilities associated with security breaches, unauthorized access, and/or unauthorized disclosure of relevant content. In one example embodiment, the solution allows an organization to simultaneously monitor and audit information passing through a plurality of data sources 110-140 the system 100 in order to detect, investigate, and prevent data compromise. The detection of relevant content may be performed prior to the content being transmitted or shared, in order to prevent the sharing of sensitive information.

In another example embodiment, the monitoring and auditing of information generated throughout the system may be used to provide data that can be utilized by the organization in discovering patterns and trends and obtain deeper understanding or insights into their user base. By reviewing and collecting relevant data from the plurality of data sources in the system, the organization may discern meaningful trends that can be used to identify areas of opportunity in as close to real-time as possible.

In one example embodiment, the data source may be cloud server 140 and comprised of one or more social site servers. Each of the social site servers may have a corresponding social search engine capable of executing a search for social data stored in its respective database based on the received search query. The social search engines may interface over network 103 with server 105 and data sources 110-135 through integrated or embedded applications configured therein. For example, the social engines may interface over network 103 with, for example, computing device 110, mobile device 115, television 120, and/or e-mail server 130.

In one example aspect of the present invention, each of the data sources and devices 110-140 in system 100 may implement a search engine that is specific to its respective data source through integrated or embedded applications that are able to index, crawl, and search for documents in each of data sources 110-140. Such integrated or embedded applications may be developed using Application Programming Interfaces (APIs) released or provided by the data source owners to allow users, such as administrators and developers, to integrate functions into applications for accessing the services of each of data sources 110-140. The search engines may receive search queries from various sources such as, for example, computing device 110 and server 105, via network 103 and perform searches according to their own search algorithm(s).

It will be understood that the above-mentioned devices are example data sources, and other types of data sources or devices that store, generate, receive, and/or transmit content may be used in system 100 to implement the present invention.

Figure 2:
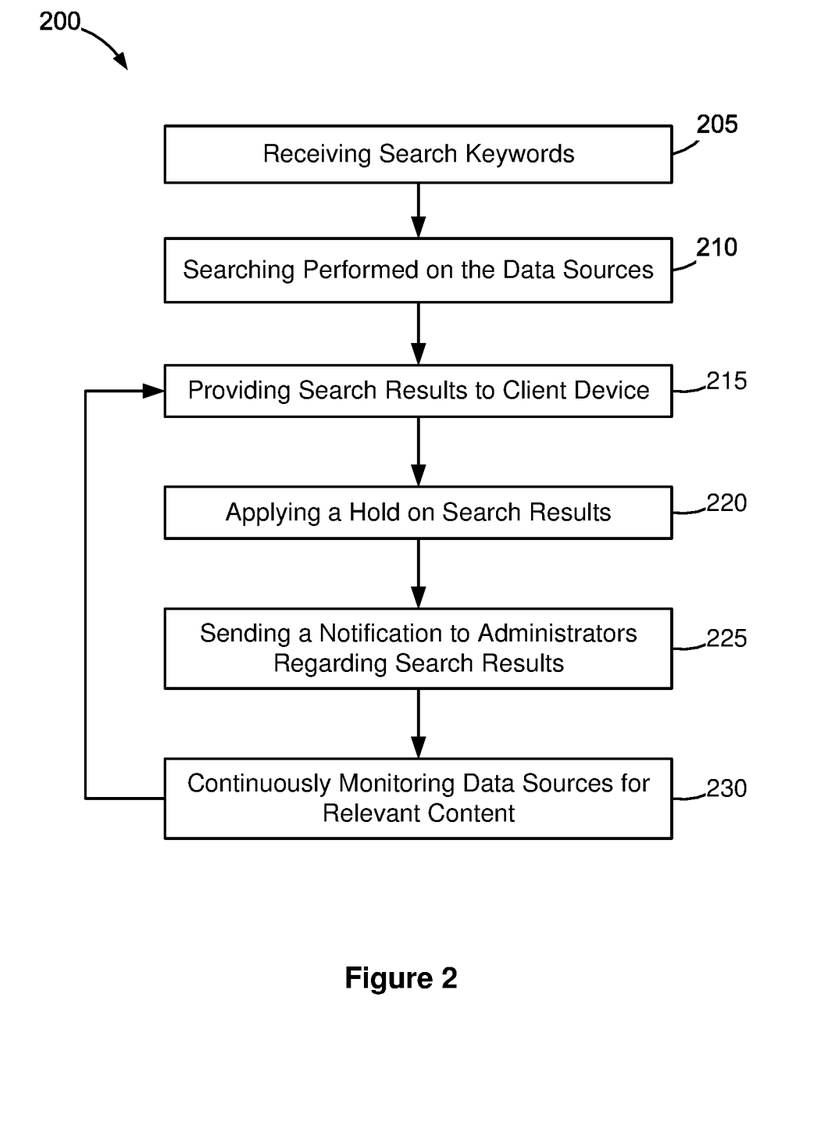
FIG. 2 shows one example method of searching and continuously monitoring relevant content that is generated or transmitted from a plurality of disparate data sources within the example system of FIG. 1.

FIG. 2 shows one example method 200 of searching and continuously monitoring relevant content that is generated or transmitted from a plurality of disparate data sources in example system 100 of FIG. 1. Example method 200 may include setting one or more search keywords for use in identifying the relevant content and searching one or more data sources in system 100 for the relevant content based on the keywords. A hold operation may be performed on the identified relevant content to prevent any tampering, transmission, modification, and/or deletion of the relevant content from the data source prior to a review and/or authorization from one or more authorized users.

In some example embodiments, example method 200 may be performed by server 105 in conjunction with computing device 110 and data sources 115-140 communicatively connected with server 105 such as, for example, mobile device 115, television 120, imaging device 125, e-mail server 130, client server 135, and cloud server 140.

At block 205, one or more keywords may be received at server 105 from a user through computing device 110 in one example embodiment. In some example aspects, the one or more keywords may be received from the user in real-time. In other example aspects, the one or more keywords may be preset or predefined by the user and stored in a configuration or definition file and received by server 105 at a preset or predetermined time.

The one or more keywords may comprise the search query or criteria to be used to search or identify relevant content. A keyword may be a term, word, phrase or combination of characters representing a subject, a condition and/or an item for which the user wishes to search. When contained in a document, a keyword may identify the document as a relevant content. Other keywords that may be used in the search query may include metadata regarding the content such as, for example, the content creation date, the author of the content, the file size, the content type, the language of the content, and/or the data source from which the content is generated.

In one example aspect, the search query may include Boolean logic operators that allow users to refine or extend the terms of the search. In another example aspect, the search query may include natural language. In still another example aspect, the search query may be a combination of Boolean logic operators and natural language.

The user may access an application or service provided by server 105 through client device 110 communicatively connected to server 105 to input the keywords and initiate a search and/or monitoring based on the keywords. In one example embodiment, the user may specify the data source where searching will be performed.

After defining the search terms, the user may initiate the search. Once the search is initiated, the search query may be communicated, sent, or transmitted to search server 105, and searching may be performed (at block 210). In some example aspects, the searching may be performed on the plurality of data sources 110-140 in system 100 based on the one or more keywords or search criteria. In other example aspects, the searching may be performed only on designated data sources 110-140 specified as part of the search query.

The searching may be performed for content generated and/or stored on the plurality of storage devices of data sources 110-140 on or before the time the searching is executed. The searching retrieves information contained across disparate data sources such as the plurality of data sources in system 100 using a query containing the one or more keywords. A single query may be used to simultaneously search across a wide range of structure, semi-structured, and unstructured data formats such as, for example, email, SQL databases, word processing documents, spreadsheets, PDFs, XML data, web pages, and enterprise software systems, among other data formats. Searching may be performed using natural language query, fielded, phrase matching, and/or other searching mechanisms as will be known in the art.

To speed up the searching, an application which may reside on or be communicatively connected to server 105 may scan documents stored in the plurality of data sources in system 100. In some example embodiments, such application may store information about the words that the application finds in the scanned documents in an index file. In some example aspects, the index may be a list of every word found in the documents. In other example aspects, the index may contain a list of specific pre-designated words or words likely to be used in forming a search query (omitting, for example, articles and prepositions). When the user enters a keyword as part of the search query, the application may use the index to find the documents or related content containing the keyword. Multiple indexes may be utilized, with each index covering a specific device or data source of system 100. In another example embodiment, a single index may be used to cover all connected data sources 110-140 in system 100.

Multiple forms of searching may be performed depending on the type of data source being searched. The multiple forms or methods for searching data sources 110-140 in system 100 may be performed using the same search query received by server 105 at block 205. In this example embodiment, the user may initiate a search for all the data sources in system 100 using a single search request, with the search request implementing multiple specific searches on each of data sources 110-140 in system 100. The multiple specific searches may be of varying types as will be appropriate or most efficient for the type of data source being searched.

In one example embodiment, the searching may be performed by web crawlers on e-mail server 135, cloud server 140 and other data sources such as, for example, local file systems, network file systems, FTP, SFTP, among others. Spidering may be performed for web-based data sources such that a web site rooted at a uniform resource locator is downloaded. A program may load the page provided by the URL, and scan it for hyperlinks that lead to other pages, and download those linked pages. The spidering process continues until the program reaches a specified link depth, downloads a predetermined number of web pages, and/or until one or more stopping condition is met.

In another example embodiment, the searching may be performed by capturing and evaluating content posted on the web via one or more applications in server 105, or in another device communicatively connected with the plurality of storage devices in system 100.

At block 215, server 105 may provide the results of the search to the device used to initiate the search query. For example, if computing device 110 was used to initiate the search query, the search results may be displayed on the user interface of computing device 110. In some other example embodiments, the search results may be provided on a device different than the device which initiated the search query.

A hold operation may be applied to the identified relevant content at block 220. Applying a hold prevents any action to be performed on the relevant content such as, for example, deletion, modification, transmission, printing, or the like, thereby reducing the potential risks and/or liabilities associated with security breaches and/or unauthorized actions performed on content of interest. Applying a hold also ensures that the integrity of the content remains intact, i.e., the content remains in its original and unmodified format for assessment, investigation, or insights and analytics purposes. In some example aspects, the search results may flagged or tagged as relevant content prior to the application of the hold operation.

In one example embodiment, a hold may refer to metadata that is created for preserved relevant content for a specific purpose or event. The metadata may include information regarding the hold, such as information about the purpose of the hold and/or any actions that may not be allowed to be executed on the content assigned to the hold. For example, a lawsuit, investigation and/or an audit may each have one or more hold lists or hold operations, with each hold having a corresponding set of keywords or search criteria. When content of interest is identified based on a search criteria, such content may be assigned to a particular hold that is associated with the search criteria. The hold assignment causes the content to be protected from modification, deletion, transmission, and/or any other action as may be specified in the metadata. Content of interest may be part of or may be assigned to any number of holds.

The hold operation may be applied via a Representational State Transfer or REST call to a server such as server 105 or through a script. Either implementation may specify the contents to apply or to which hold list to apply the hold. For example, in the case of a tax audit, a hold operation may execute the action of "apply documents X and Y to the IRS Audit Hold." In one example embodiment, a user may be given administrative privileges to view content assigned to a given hold. Documents may also be unassigned, thereby removing the protection against modification or transmission on the unassigned documents.

At block 225, a notification may be sent to one or more users regarding the search results via a visual indicator displayed on a user interface, electronic mail, SMS message or any other communication means as will be known in the art. Such notified users may be stakeholders or administrators who review the identified relevant content to determine whether any further action is required on the relevant content and or whether any further action is required on an individual involved in generating, creating, printing or otherwise transmitting or receiving the relevant content. The stakeholders may be provided with one or more preset actions to be performed on the relevant content such as, for example, deleting the relevant content, notifying the content creator, and flagging/unflagging or assigning/unassigning the content from the hold, among others.

After the initial searching of relevant content, the search query may be further used to proactively discover relevant content that may be generated by the plurality of data sources in the future. In some example embodiments, an automatic continuous identifying of new or additional content as it is generated or posted by any one of data sources 110-140 and/or as the content passes through system 100 may be performed at block 230. In other example embodiments, monitoring for new content may occur at a predetermined time(s) or interval(s).

As new content is captured by server 105 going forward, server 105 will continue to identify keywords and/or index data from the generated content. A searching for the relevant content is performed by automatically and continuously identifying if the indexed data from the content being generated by data sources 110-140 matches the keywords. In other example embodiments, searching for relevant content may occur at a predetermined time(s) or interval(s).

When relevant content is identified, a hold operation may be applied to the content to prevent tampering, deletion, modification, transmission, dissemination, and/or other unauthorized actions to be performed on identified relevant content. Notifications may then be sent to specified users such as stakeholders or administrators to notify them when new or additional content bearing the specified keywords, phrases, or conditions are found. Through the proactive and continuous discovery of content that may be of interest for the organization, alerts may be issued on a substantially real-time basis that forewarns users and administrators of the occurrence of content of interest, potential security breaches and/or any unauthorized actions within the organization.

In one example aspect of the present invention, server 105 may generate insights and analytics based on the results of the searching for the relevant content and according to the keywords or search query used for the searching. In this example aspect, the keywords and/or the search query may represent a topic being monitored in system 100, and the results of the searching may be the collected data from which analytics may be derived. The collecting of data based on the topics being monitored may be performed until a monitoring threshold is reached. A monitoring threshold may be set to ensure that sufficient data is collected based on the topics being monitored to identify meaningful patterns therein. The monitoring threshold may be set in any number of ways. For example, the monitoring threshold may be set according to a period of time elapsed from the start of the data collection, a total amount of data collected, and/or a total amount of data collected from one or more specific data sources 110-140, among others. The collected data may include structured data, unstructured data, or a combination thereof.

Analytics may refer to sets of data that can be used to establish meaningful patterns in the topic being monitored. As one example, an analytic based upon the keywords "technical support needed" may, for example, illustrate that e-mail communications associated with the keywords are received in a significant frequency for a specified period of time. Such data may enable a user or administrator to provide predictions related to certain products, customers, etc.

It will be understood that the example methods and applications described herein are illustrative and should not be considered limiting. It will be appreciated that the actions described and shown in the example flowcharts may be carried out or performed in any suitable order. It will also be appreciated that not all of the actions described in FIG. 2 need to be performed in accordance with the example embodiments of the disclosure and/or additional actions may be performed in accordance with other example embodiments of the disclosure.

Many modifications and other example embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of searching and monitoring content from a plurality of data sources, comprising:
   performing an initial search of one or more relevant content by:
   receiving a keyword to be used in searching for the one or more relevant content from the plurality of data sources;
   searching the plurality of data sources for the one or more relevant content associated with the keyword;
   preventing an action to be performed on the one or more relevant content identified to be associated with the keyword; and
   notifying one or more users regarding the one or more relevant content that is associated with the keyword;
   after performing the initial search for the relevant content, continuously monitoring the plurality of data sources to determine if the plurality of data sources generate new content that is associated with the keyword; and preventing an action to be performed on the new content determined to be associated with the keyword; and wherein the preventing any action to be performed on the one or more relevant content includes preventing transmission of the one or more relevant content from one data source to another;

wherein preventing the action to be performed comprises: performing a hold operation on the one or more relevant content identified to be associated with the keyword; wherein the hold operation comprises ensuring the relevant content and metadata associated therewith each remain in an original and unmodified format, respectively; and wherein continuously monitoring comprises constantly searching the plurality of data sources as content is generated and/or posted by any of the plurality of data sources.

2. The method of claim 1, wherein the searching for the one or more relevant content associated with the keyword from the plurality of data sources includes sending a search query having the keyword to a search engine of at least one of the plurality of data sources.

3. The method of claim 1, wherein the searching for the one or more relevant content associated with the keyword from the plurality of data sources includes searching for the one or more relevant content from one or more cloud-based data sources residing in one or more cloud networks.

4. The method of claim 1, wherein the searching for the one or more relevant content associated with the keyword from the plurality of data sources includes searching for the one or more relevant content from one or more social media platforms.

5. The method of claim 1, wherein the searching for the one or more relevant content associated with the keyword from the plurality of data sources includes searching for the one or more relevant content from one or more file systems.

6. The method of claim 1, further comprising generating an analytic based on results of the searching for the one or more relevant content associated with the keyword.

7. The method of claim 1, wherein the preventing an action to be performed on the one or more relevant content includes preventing deletion of the one or more relevant content.

8. A method of monitoring one or more data sources for one or more documents of interest, comprising:

receiving a criterion to be used in identifying the one or more documents of interest from the one or more data sources;

creating a search query using the criterion;

using the created search query, triggering a search in each of the one or more data sources for the one or more documents that match the criterion;

receiving from each of the one or more data sources the one or more matching documents;

preserving results of the searching, wherein a hold operation is performed on the one or more matching documents, wherein the hold operation comprises ensuring the one or more matching documents remain in an original and unmodified format;

continuously monitoring the one or more data sources to determine if the one or more data sources contain additional one or more documents that match the search query;

wherein the hold operation comprises ensuring relevant content and metadata associated with the matching documents each remain in an original and unmodified format, respectively; and wherein continuously monitoring comprises constantly searching the one or more data sources as content is generated and/or posted by any of the one or more data sources.

9. The method of claim 8, wherein the continuously monitoring the one or more data sources includes identifying if a document that is transmitted to or from the one or more data sources matches the search query; and wherein preserving the results of the searching includes disabling transmission of the results of the searching.

10. The method of claim 8, wherein the preserving the results of the searching includes disabling deletion of the results of the searching from the one or more data sources.

11. The method of claim 8, further comprising generating an analytic based on the results of the searching for the one or more matching documents.

12. The method of claim 8, further comprising notifying authorized users when the continuously monitoring of the one or more data sources identifies one or more documents that match the search query.

13. A non-transitory computer-readable storage medium storing instructions for preserving sensitive content in an original format, that when executed by a computer, cause the computer to perform a method for monitoring a plurality of data sources for content of interest, the method comprising:

receiving from a computing device one or more search terms for use in identifying the content of interest;

generating a search query based on the one or more search terms;

transmitting the search query to the plurality of data sources;

receiving from each of the plurality of data sources the content of interest that matches the one or more search terms of the search query;

adding the matching content of interest to a hold list;

performing a hold operation on the content of interest, wherein the hold operation comprises ensuring the content and metadata associated with the content remains in an original and unmodified format; and proactively monitoring the plurality of data sources for additional content of interest by constantly searching the plurality of data sources as content is generated and/or posted by any of the plurality of data sources.

14. The non-transitory computer-readable storage medium of claim 13, wherein the method performed further comprises triggering a search request on each of the plurality of data sources using the search query to identify the content of interest.

15. The non-transitory computer-readable storage medium of claim 13, wherein the proactively monitoring the plurality of data sources includes indexing new content generated at the plurality of data sources.

16. The non-transitory computer-readable storage medium of claim 15, further comprising one or more instructions for identifying whether a content of interest has been generated at one or more of the plurality of data sources by searching the indexed content for a match using the search query; and wherein the instructions for adding the matching content of interest to the hold list comprise instructions for preventing a transmission of the matching content of interest.

17. The non-transitory computer-readable storage medium of claim 15, wherein the adding the matching content of interest to the hold list includes preventing a deletion of the matching content of interest from its data source.

18. The non-transitory computer-readable storage medium of claim 13, further comprising generating an analytic based on results of the searching for the matching content of interest.

* * * * *